Sept. 11, 1956     R. A. GILMOUR     2,762,526
COMBINATION CONTAINER AND MEASURING APPLIANCE
Filed Oct. 1, 1953
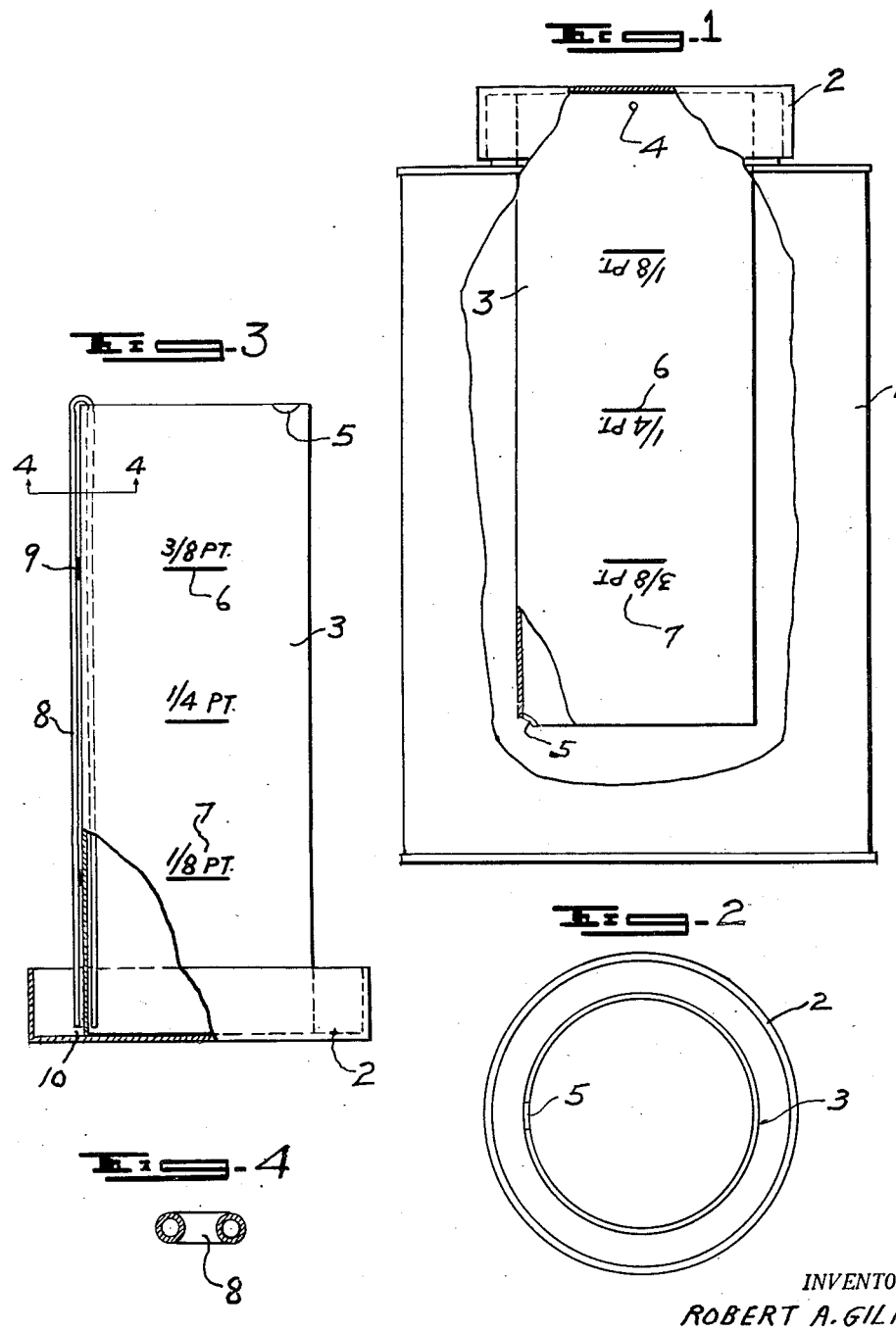
INVENTOR.
ROBERT A. GILMOUR
BY
Jack R Snyder
ATTORNEY

United States Patent Office 2,762,526
Patented Sept. 11, 1956

2,762,526

COMBINATION CONTAINER AND MEASURING APPLIANCE

Robert A. Gilmour, Somerset, Pa.

Application October 1, 1953, Serial No. 383,606

1 Claim. (Cl. 222—115)

This invention relates to a container embodying a measuring appliance, and while primarily intended for containing and measuring liquids in the form of oils and the like, it will be obvious that the device may be employed for containing and measuring contents in powdered or granular form or any other products to be used in fairly accurate predetermined quantities and wherein it is found to be applicable.

Important objects and advantages of the invention are to provide a device of the character described, which combines a container carrying a self-contained measuring appliance whereby the contents of the container may be conveniently measured for use in any predetermined quantities by anyone of ordinary skill, which is simple in its construction and arrangement, durable and efficient in its use, and comparatively economical in its manufacture.

With the foregoing and other objects in view which will appear as the description proceeds, the invention resides in the novel construction, combination and arrangement of parts herein specifically described, but it is to be understood that changes in the form, proportions and details of construction may be resorted to that come within the scope of the claim hereunto appended.

In the drawing wherein like numerals of reference designate corresponding parts throughout the several views:

Figure 1 is a side elevational view, with portions broken away and in section, of a combination container and measuring appliance, constructed in accordance with the invention.

Figure 2 is a bottom plan view of the container lid and of the measuring receptacle carried by the container lid.

Figure 3 is a side elevational view of the lid and measuring receptacle embodying a modified form of venting device.

Figure 4 is a sectional view of the venting device taken on line 4—4, Figure 3.

Referring in detail to the drawing, the improved device comprises a container 1 which may be in the form of an ordinary cylindrical sheet metal can. The container includes a removable lid 2 which is engaged in any suitable manner to close the opening in the top of the container in the usual well known manner.

A cylindrical measuring receptacle 3 is carried by the lid 2, and is permanently attached, at the central position, against the under face of the latter. While the portion of the inner face of the lid enclosed by the attached measuring receptacle, as shown, provides the bottom for the latter, it will be apparent that the measuring receptacle may be provided with a bottom apart from the lid without departing from the principle of the invention.

When the lid 2 is engaged in the closing position on the container 1, the attached measuring receptacle 3 depends vertically into the container, and of course into the contents within the latter. The free end of the measuring receptacle is open allowing the contents of the container to enter into the measuring receptacle while the latter is entering the container when placing the lid in the closing position on the container.

A small vent hole 4 is provided adjacent to the attached end of the measuring receptacle 3 to exhaust any compressing air that might be created within the measuring receptacle during the movement of the latter into the contents of the container, particularly if such contents is in liquid form. Due to the small size of the vent hole, leakage through the latter during measuring and pouring operations would be of no appreciable extent.

The edge of the free end of the measuring receptacle 3 is formed with a suitable pouring recess 5 to direct the flow of contents from the measuring receptacle and thereby facilitate the pouring operations from the latter.

The exterior of the measuring receptacle 3 is provided with and displays spaced visible line marks 6. Each of the line marks is associated with a shown quantity designation 7 indicating the amount of the contents within the measuring receptacle when such contents is level with any respective line mark, whereby the user may readily determine and measure any amount of the contents required.

The measuring receptacle 3 may be constructed of thin sheet metal, composition material, paper, or any other suitable inexpensive transparent or opaque material, as the measuring receptacle is usually discarded along with the associated container 1 when the contents of the latter are depleted. Due to the thinness of the material from which the measuring receptacle is constructed, the displacement of the container contents effected thereby is negligible.

In the use of the improved device it is only necessary to remove the lid 2 together with the attached measuring receptacle 3 from the container 1, and then pour contents from the container into the measuring receptacle until the required measured quantity of the contents has been placed into the measuring receptacle.

In Figure 3 is illustrated a modified form of venting means, which comprises a substantially U-shaped venting tube 8. The venting tube straddles the wall of the measuring receptacle and is fixed to the latter by soldering 9, or in any other suitable manner, and has the free open ends thereof disposed adjacent to the under face of the lid 2, as indicated at 10.

The present invention provides a most efficient device of its kind, which may be economically constructed and successfully employed for the purposes and in the manner herein set forth.

What I claim is:

A device of the class described comprising, in combination, a container, a removable lid for said container, a measuring receptacle including a side wall having one end thereof permanently fixed against the under face of said lid and the other end thereof being free and open, said lid forming the bottom for said receptacle, the edge of the free end of said side wall being provided with a pouring recess, the surface of said side wall provided with visible indicia designating the content capacity of said receptacle at indicated levels, and a substantially U-shaped air venting tube straddling said side wall and being permanently fixed to the latter, the free open ends of said tube being disposed adjacent to the underface of said lid at respective sides of said side wall.

References Cited in the file of this patent

UNITED STATES PATENTS

| | | |
|---|---|---|
| 1,217,732 | Fedders | Feb. 27, 1917 |
| 1,548,267 | Mulloy | Aug. 4, 1925 |
| 1,780,875 | Gordon | Nov. 4, 1930 |
| 2,559,168 | Numbers | July 3, 1951 |